Patented Apr. 25, 1944

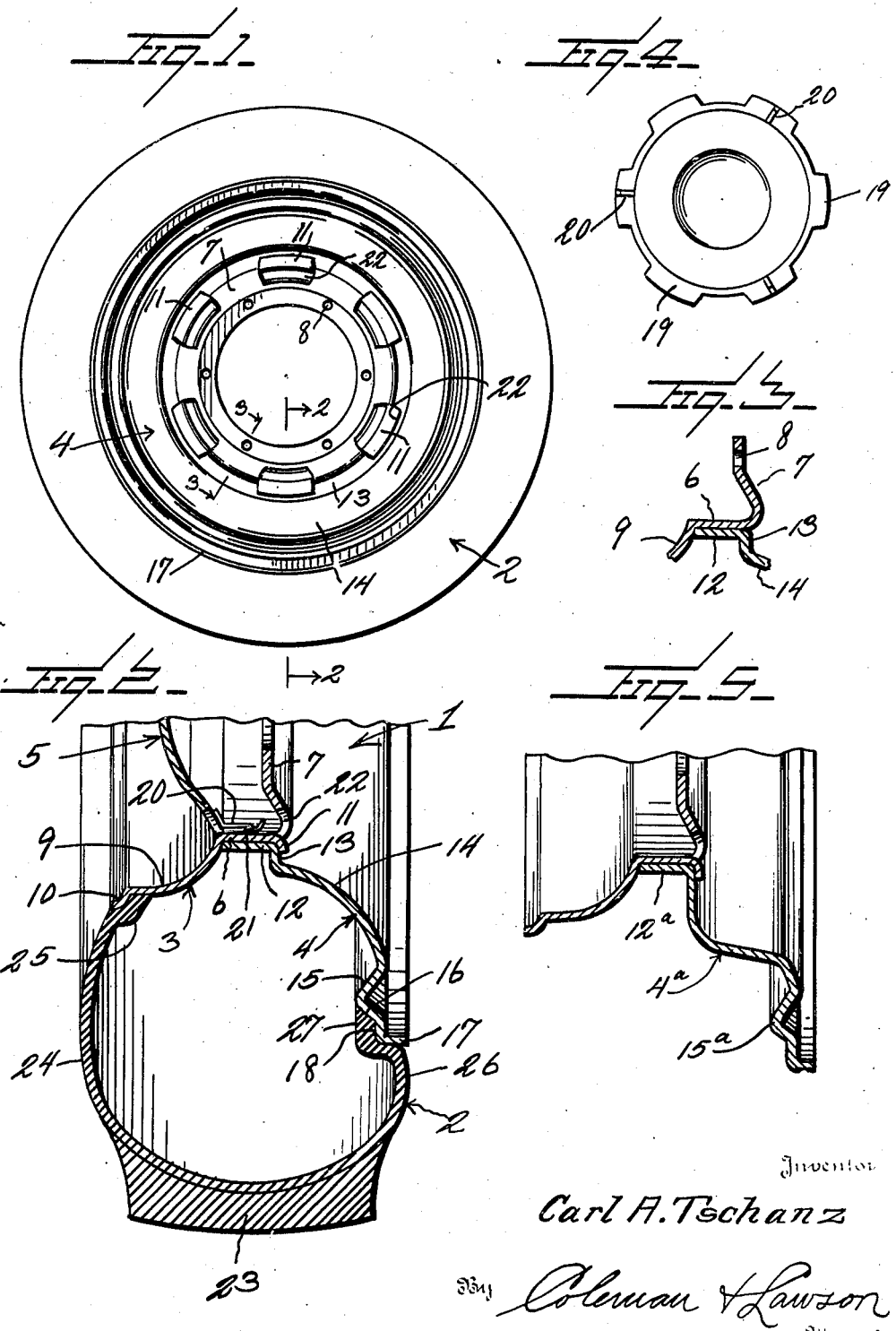

2,347,622

UNITED STATES PATENT OFFICE 2,347,622

VEHICLE WHEEL AND TIRE

Carl A. Tschanz, Moody Field, Valdosta, Ga.

Application July 14, 1942, Serial No. 450,883

3 Claims. (Cl. 301—97)

This invention relates generally to the class of wheels and tires and pertains particularly to a novel wheel and tire construction having certain novel advantages over the conventional style of wheel and tire such as is at present employed.

An important object of the present invention is to provide a novel wheel construction consisting of two principal units which are so designed that each may be readily stamped from a single piece of metal of suitable weight and the two units may be then readily joined together without the employment of bolts, rivets or welding, to form the complete wheel. This novel design makes possible the construction of the wheel body from less material and with less labor than is required for the construction of wheel rims of standard or conventional style.

Another object of the invention is to provide a novel wheel and tire assembly, in which the design of these two parts is such that the possibility of damaging the inner tube is greatly reduced in the event that the tire is run under inflated; the heeling over action of the tire when traveling along a curved path is reduced to a minimum thus greatly reducing the wear and tear upon the tire, and the control of the vehicle equipped with the improved tire and wheel assembly, is greatly facilitated in the event that a tire becomes punctured or blows out during the operation of the vehicle at high speed, due to the formation of the inner peripheral portion of the tire rim of greater diameter than the outer portion so that the drop of the wheel upon deflation of the tire is very slight.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a view in elevation of the inner side of a wheel and tire constructed in accordance with the present invention.

Figure 2 is a sectional view, on an enlarged scale, taken on the line 2—2 of Figure 1.

Figure 3 is an enlarged fragmentary sectional view taken on the line 3—3 of Figure 1.

Figure 4 is a view in elevation of the inner face of the hub cap.

Figure 5 is a sectional view of a portion of the wheel showing a modification of the inner flange form.

Referring now more particularly to the drawing the numeral 1 generally designates the wheel while the tire which is especially designed for the special wheel construction, is generally indicated by the numeral 2.

The wheel 1 is formed in three sections which consist of the outer rim portion 3, the inner rim portion 4 and the hub cap or hub cover 5. These portions may all be formed by pressing from a single piece of material and as a result of the novel formation of the inner and outer rim sections these are joined together in a novel manner without the use of securing elements and without welding.

In accordance with the present invention the outer rim section 3 comprises a central annular portion 6 which is of substantial width and this annular portion merges at its inner edge with the inwardly extending annular flange 7 which forms a mounting ring by which the wheel is secured in position against the outer side of the brake drum in the customary manner. This flange or mounting ring 7 is provided with a series of bolt openings 8 for the reception of the stud bolts which are carried by the wheel brake drum.

The outer edge of the central annular portion 6 merges with the transversely curved bordering portion 9 which in turn merges with the edge flange or rim 10 which engages against the outer side of one bead of the tire to maintain such bead in position on the wheel. The overall diameter of the flange 10 is only slightly greater than the diameter of the central annular portion 6 as clearly shown in Figure 2.

At spaced intervals the annular flange or mounting ring 7 has pressed therefrom the locking tongues 11 which are employed for coupling together the two portions 3 and 4 of the wheel. The annular portion 6 is of substantial width as shown and the tongues 11 are cut or pressed out from the flange 7 so as to initially form continuations of the edge of the portion 6 in the plane thereof.

The inner side portion 4 of the wheel also has a relatively wide annular central portion 12 substantially corresponding in width with the central portion 6 of the section 3. This annular portion 12 is of slightly greater diameter than the portion 6 so that it may engage snugly around the portion 6 in the manner illustrated. The outer edge of the portion 12 buts against the portion 9 of the outer rim section 3 when the two portions 6 and 12 are in assembled relation as shown. The inner edge of the portion 12 merges with the narrow outwardly, extending surrounding flange part 13 which in turn merges with the inwardly and radially directed arcuate portion 14 which adjacent its free edge is pressed to form the annular rib 15 upon the side of the portion 14 facing the outer side of the wheel, thereby forming a surrounding shoulder 16 against which the inner bead of the tire rests as illustrated.

Integral with the outer portion of the rib 15 is a narrow inwardly and axially directed tread flange 17, the function of which will be hereinafter set forth. The straight portion lying between the shoulder 16 and the tread flange 17 forms a radial shoulder surface 18 which coacts with the shoulder 16 to maintain the inner bead of the tire in position.

After the two wide central portions 6 and 12 of the rim sections have been assembled one within the other the tongues 11 are bent over to partially engage against the inner side of the portion 13 thereby preventing the annular portion 12 from slipping off of the annular portion 6 of the outer rim section 3. Thus the two rims sections are securely locked together without welding and without the employment of bolts, rivets or other coupling elements.

The hub cap 5 is preferably formed to have the short spoke sections 19 which engage against the outer corner of the annular portion 6. Certain of these spoke sections are provided with the spring clips 20 which engage over suitable lugs 21 positioned upon the inner face of the annular portion 6, to maintain the hub cap in position. The spaces between the spokes 19 will be located opposite the openings 22 which are formed by striking out the tongues 11 from the mounting ring or annular flange 7 so that the securing strap of anti-skid units may be readily passed through from one side of the wheel to the other when it is desired to secure such units to the tire.

The tire 2 is formed with the tread portion 23 and with a relatively wide and substantially straight outer side wall 24 terminating at its inner edge in the bead 25 which rests against the radial face of the portion 9 and against the inner side of the flange 10. The inner side of the tire has a relatively short inner wall 26 which terminates at its inner edge in the bead 27 which positions against the shoulders 16 and 18. The tread flange 17 alines with the inner wall 26 of the tire and this flange functions to prevent the pinching of the tire inner tube, not shown, in the event that the tire is run under-inflated.

By forming the tire with the relatively long and substantially straight outer wall 24 and the short inner wall 26 the heeling over of the tire on turns is prevented. This heeling over causes lateral sway or roll of the vehicle, and is counteracted by the bracing action which is given to the wheel and tire structure by the extension of the inner rim section 4 or, in other words, by making the inner rim section of materially greater diameter than the outer section in the manner illustrated. This construction also provides an additional safety feature at such times when the tire goes flat at high speed, since the drop of the wheel will not be very great and, therefore, will not pull the vehicle to one side because of the unequal diameters of the wheels.

While the outside wall 24 of the tire has been referred to as being straight this is not strictly correct but the curvature is so slight that the action obtained is the same as that which would be obtained if the wall were perfectly straight. It is this outer substantially straight wall that reduces heeling over and side sway. This action occurs in those tires where the outer wall has an excessive curve because of the tendency for the excessively curved wall to be pulled underneath the wheel when the vehicle deviates from its straight ahead course. The straighter the outer wall is, the less chance there is of the tire heeling over. Moreover, there is less strain on a tire with a relatively straight outside wall, when the vehicle is making a turn.

The special shape or design of the inner wall 26 of the tire here shown makes is possible for the inner rim section to be of larger diameter. The curvature of the tire adjacent to the tread is of normal radius, but the curvature of the inner wall is of a small radius. One purpose of this is to absorb the flexing produced by impacts and the like, more easily than a straight stiff side wall would do. Not only will a well curved inner side wall absorb the flexing better but it will do so with less strain on the tire. As previously stated the tread flange 17 functions as a safeguard against pinching the inner tube when the tire is run at less than full inflation.

Where it may be desired to employ the wheel construction of the present invention with a large brake drum, the inner rim section may be modified as illustrated in Figure 5. In this view the inner rim secton is indicated generally by the numeral 4a and it will be seen that the portion of this section lying between the inner annular portion 12a and the rib 15a, bows towards the center of the tire instead of outwardly away from the tire center as does the section 4 shown in Figure 2. The other features of the rim sections are the same as in the embodiment of the invention shown in Figure 2.

I claim:

1. A wheel for a pneumatic tire comprising two annular sections each of said sections being formed to provide a band like annulus, one of said band like annuli being frictionally engaged with the other one, the remote edges of said annular sections being flanged to form an abutment shoulder for a tire casing bead, and locking-tongues forming an integral part of one band like annulus and engaged across an edge of the other annulus for effecting a locking connection between the annuli.

2. A wheel constrction as set forth in claim 1, including a radially inwardly directed mounting annulus forming an integral continuation of an edge of a band like annulus.

3. A wheel construction for a pneumatic tire comprising two annular band like portions disposed one within the other, said portions at opposite edges merging with outwardly extending portions, each of said outwardly extending portions terminating at its free outer edge in a tire casing rim bead engaging flange, locking tongues formed integrally with the other edge of the innermost one of the band like portions and engaging over the adjacent edge of the outermost band like portion to interlock said band like portions, and an annular mounting plate forming a radial continuation inwardly from the said other edge of the innermost one of the band like portions.

CARL A. TSCHANZ.